United States Patent
Eckhardt et al.

(10) Patent No.: US 7,184,496 B2
(45) Date of Patent: Feb. 27, 2007

(54) COMPLEMENTARY CODE DECODING BY REDUCED SIZED CIRCUITS

(75) Inventors: Uwe Eckhardt, Dresden (DE); Eric Sachse, Dresden (DE); Ingo Kühn, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 809 days.

(21) Appl. No.: 10/464,965

(22) Filed: Jun. 19, 2003

(65) Prior Publication Data
US 2004/0086062 A1 May 6, 2004

(30) Foreign Application Priority Data
Oct. 31, 2002 (DE) .................................. 102 50 891

(51) Int. Cl.
*H03D 1/00* (2006.01)
(52) U.S. Cl. ...................... 375/343; 375/142; 375/150; 708/422
(58) Field of Classification Search ................ 375/130, 375/142, 143, 150, 152, 343; 370/320, 335, 370/342, 209; 708/314, 422, 426
See application file for complete search history.

(56) References Cited

U.S. PATENT DOCUMENTS

| | | | |
|---|---|---|---|
| 5,841,813 A | 11/1998 | van Nee | |
| 6,882,692 B2 * | 4/2005 | Somayazulu | 375/343 |
| 6,934,319 B2 * | 8/2005 | Subramanian | 375/142 |
| 2002/0122466 A1 | 9/2002 | Somayazulu | |

FOREIGN PATENT DOCUMENTS

| | | |
|---|---|---|
| EP | 1207657 | 11/2000 |
| EP | 1178630 | 7/2003 |
| JP | 2000-307548 | 11/2000 |

OTHER PUBLICATIONS

Heeg M: "Vernetzung Ohne Schnur, Neuer Chipsatz Beschleunigt Lokale Funknetze Auf 11 Mbit/s", Elektronik, Franzis Verlag GMBH, Munchen, DE, vol. 48, No. 10, May 18, 1999, pp. 68-74, XP000896534 ISSN: 0013-5658.
International search report application No. PCT/US03/35434 mailed Apr. 28, 2004.

* cited by examiner

*Primary Examiner*—Dac V. Ha
(74) *Attorney, Agent, or Firm*—Meyertons Hood Kivlin Kowert & Goetzel, P.C.; B. Noël Kivlin

(57) ABSTRACT

A complementary code decoder technique is provided where the encoded input data is first parallelized. From the parallelized data, correlation values are generated by a correlator circuit that is capable of changing its correlation characteristics depending on at least one control signal. Different control signals are sequentially provided to the correlator circuit thereby driving the correlator circuit to sequentially generate multiple correlation values from the parallelized data, based on different correlation characteristics. From the multiple correlation values, the correlation value that represents the optimum correlation is identified. This technique significantly reduces the gate count of the decoder structure, thus saving chip area and manufacturing costs.

48 Claims, 4 Drawing Sheets

COMPLEMENTARY CODE DECODING BY REDUCED SIZED CIRCUITS

BACKGROUND OF THE INVENTION

1. Field of the Invention

The invention generally relates to complementary code decoders, and in particular to data communications receivers such as WLAN (Wireless Local Area Network) receivers comprising such decoders.

2. Description of the Related Art

A wireless local area network is a flexible data communications system implemented as an extension to or as an alternative for, a wired LAN. Using radio frequency or infrared technology, wireless LANs transmit and receive data over the air, minimizing the need for wired connections. Thus, wireless LANs combine data connectivity with user mobility.

Most WLAN systems use spread spectrum technology, a wide-band radio frequency technique developed for use in reliable and secure communication systems. The spread spectrum technology is designed to trade-off bandwidth efficiency for reliability, integrity and security. Two types of spread spectrum radio systems are frequently used: frequency hopping and direct sequence systems.

The standard defining and governing wireless local area networks that operate in the 2.4 GHz spectrum, is the IEEE 802.11 standard. To allow higher data rate transmissions, the standard was extended to the 802.11b standard that allows data rates of 5.5 and 11 Mbps in the 2.4 GHz spectrum. This extension is backwards compatible as far as it relates to direct sequence spread spectrum technology, but it adopts a new modulation technique called CCK (Complementary Code Keying) which allows for realizing the speed increase.

Complementary codes, also referred to as binary complementary sequences or series, may generally be defined as codes that comprise a pair of sequences of equal finite length, having the property that the number of pairs of like elements with any given separation in one series is equal to the number of pairs of unlike elements with the same separation in the other series. This leads to some symmetry resulting in a periodic autocorrelative vector sum being zero everywhere except at the zero shift.

A binary complementary code is a subset of the more general class of codes known as polyphase codes. A polyphase complementary code is a sequence having complementary properties, and being made of elements that have phase parameters. More specifically, such elements are e. g. members of a set of complex numbers $\{1, -j, -1, j\}$ with $j^2 = -1$.

CCK uses the complex set of Walsh/Hadamard functions as complementary codes. The Walsh codes can be formed by a successive folding operation, and they may be considered to be a block code which translates (at full rate) a sequence of bits $d_i$ into a codeword C of complex chips $c_i$. In the CCK-11 case, i. e. where a data rate of 11 Mbps is used, the number of bits $d_i$ and the number of chips $c_i$ are eight. At 5.5 Mbps, the number of bits $d_i$ is four and the number of chips $c_i$ is eight. The following equation represents the eight complex chip values for the CCK code set, with the phase variable being QPSK (Quadrature Phase Shift Keying) phases:

$$C = \begin{bmatrix} c_0 \\ c_1 \\ c_2 \\ -c_3 \\ c_4 \\ c_5 \\ -c_6 \\ c_7 \end{bmatrix} = \begin{bmatrix} \exp(j(\varphi_1 + \varphi_2 + \varphi_3 + \varphi_4)) \\ \exp(j(\varphi_1 + \varphi_3 + \varphi_4)) \\ \exp(j(\varphi_1 + \varphi_2 + \varphi_4)) \\ \exp(j(\varphi_1 + \varphi_4)) \\ \exp(j(\varphi_1 + \varphi_2 + \varphi_3)) \\ \exp(j(\varphi_1 + \varphi_3)) \\ \exp(j(\varphi_1 + \varphi_2)) \\ \exp(j(\varphi_1)) \end{bmatrix}$$

The variables $\varphi_1$, $\varphi_2$, $\varphi_3$ and $\varphi_4$ are complex QPSK phasors mapped from the data bits as follows: The first phasor $\varphi_1$ undergoes a different bit mapping for each even or odd CCK symbol:

| $(d_0, d_1)$ | CCK symbol even | odd |
|---|---|---|
| (0,0) | 0 | π |
| (0,1) | π/2 | 3π/2 |
| (1,1) | π | 0 |
| (1,0) | 3π/2 | π/2 |

The other phasors $\varphi_2$, $\varphi_3$ and $\varphi_4$ define the basecode, and the QPSK encoding table in this case is for CCK-11:

| $(d_i, d_{i+1})$ | $\varphi_2, \varphi_3, \varphi_4$ |
|---|---|
| (0,0) | 0 |
| (0,1) | π/2 |
| (1,0) | π |
| (1,1) | 3π/2 | and for CCK-5.5 (CCK at 5.5 Mbps):

$$\varphi_2 = d_2 \cdot \pi + \frac{\pi}{2} \quad \varphi_3 = 0 \quad \varphi_4 = d_3 \cdot \pi$$

Thus, $\varphi_2$, $\varphi_3$ and $\varphi_4$ define 64 different CCK codes of 8 bits (with CCK-11) or 4 different CCK codes of 4 bits (with CCK-5.5), and the differential encoded phasor $\varphi_1$ gives an extra phase rotation to the entire codeword since it is part of all chips in one codeword.

That is, to make 11 Mbps CCK modulation, the data is grouped into 2 bits and 6 bits. The 6 information bits are used to select one of 64 complex vectors of 8 chip length for the symbol and the other 2 bits DQPSK (Differential QPSK) modulate the entire symbol. In the 5.5 Mbps mode, the data is grouped into 4 bits nibbles where 2 of those bits select the spreading function out of the set of four while the remaining 2 bits QPSK modulate the symbol. The spreading sequence then DQPSK modulates the carrier by driving the I and Q modulators.

Referring now to FIG. 1, a block diagram of a conventional CCK modulator is illustrated that may be used in a transmitter. In the modulator, a multiplexer 100 receives scrambled data and multiplexes the input data either to the code selector 110 or to the modulator 120. The multiplexer 100 gets clocked at the symbol rate, i. e. at 1.375 MSps. The code selector 110 selects one of the complex codes that is to be fed to the modulator 120. This code represents the information bits that are spread over the basecode phasors $\phi_2$, $\phi_3$ and $\phi_4$. The bits that the modulator 120 receives from the multiplexer 100 are the two least significant (i.e. first incoming) bits $d_0$, $d_1$ that are used to QPSK (Quadrature Phase Shift Keying) modulate the codeword. The outputs of the modulator 120 are respective I and Q signals.

On the receiver side, a conventional CCK demodulator as shown in FIG. 2 may be used that decodes the received CCK codes using a fast Walsh transformation technique. This functionality is generally provided in the WLAN baseband processor, and it provides a channel matched filter 200 that supplies the filtered signals to a Walsh transformation block 210. It is to mentioned that a channel matched filter 200 as shown in FIG. 2 needs not necessarily be provided in a CCK demodulator. In the CCK-11 (or CCK-5.5) Walsh transformer, a bank 220 of 64 (or 4) correlators followed by a maximum detector 230 determines which code was transmitted giving the most significant 6 bits (or 2 bits) of the data word. The other 2 bits of the data word are determined from the QPSK phase of the symbol and fed to the sign detector 240. For this purpose, the sign detector 240 may comprise a differential demodulator, but it is again to be mentioned that a sign detector 240 as shown in FIG. 2 needs not necessarily be provided in a CCK demodulator.

Assuming R to be the received signal vector, and C* the conjugate code vector, the Walsh transformer 210 has to search for the maximum correlation of R over all codewords. For doing so, a high number of correlations R·C* need to be computed and compared, to detect the ML (maximum likelihood) codeword:

$$R \cdot C^* = \exp(-j\varphi_1) \cdot \begin{bmatrix} 1 \times \exp(-j\varphi_2) \times \exp(-j\varphi_3) \times \exp(-j\varphi_4) \\ 1 \times \exp(-j\varphi_3) \times \exp(-j\varphi_4) \\ 1 \times \exp(-j\varphi_2) \times \exp(-j\varphi_4) \\ 1 \times \exp(-j\varphi_4) \\ 1 \times \exp(-j\varphi_2) \times \exp(-j\varphi_3) \\ 1 \times \exp(-j\varphi_3) \\ 1 \times \exp(-j\varphi_2) \\ 1 \end{bmatrix} \cdot \begin{bmatrix} r_0 \\ r_1 \\ r_2 \\ -r_3 \\ r_4 \\ r_5 \\ -r_6 \\ r_7 \end{bmatrix}$$

$$= R \cdot \exp(-j\varphi_1) \cdot C_B^*$$

This expression can be written as:

$R \cdot C^* = e^{-j\phi_1} \{ [(r_0 e^{-j\phi_2} + r_1) e^{-j\phi_3} + (r_2 e^{-j\phi_2} - r_3)] e^{-j\phi_4} + [(r_4 e^{-j\phi_2} + r_5) e^{-j\phi_3} + (-r_6 e^{-j\phi_2} + r_7)] \}$ Thus, each of the correlations that are to be computed may be implemented using the CCK correlator circuit shown in FIG. 3. That is, conventional CCK decoders require a correlator bank 220 that includes up to 64 CCK correlator circuits such as that shown in FIG. 3. This consumes a large amount of chip area and leads to substantial manufacturing costs.

SUMMARY OF THE INVENTION

An improved complementary code decoding technique is provided that may allow for saving chip space and costs without deteriorating the overall system performance.

In one embodiment, a WLAN receiver is provided that has a CCK decoder. The CCK decoder comprises a serial-to-parallel converter that is connected to receive CCK encoded input data and output a parallelized representation thereof. The CCK decoder further comprises a correlator circuit that is connected to receive the parallelized input data and generate correlation values therefrom. The correlator circuit is capable of changing its correlation characteristics depending on at least one control signal. The CCK decoder further comprises a state transition controller that is adapted to sequentially provide different control signals to the correlator circuit thereby driving the correlator circuit to sequentially generate multiple correlation values from the parallelized input data based on different correlation characteristics. Further, the CCK decoder comprises a best correlation picker circuit that is connected to receive the multiple correlation values and that is adapted to identify the correlation value that represents the optimum correlation.

In another embodiment, there may be provided a complementary code decoder that comprises a serial-to-parallel converter that is connected to receive serially encoded input data and output a parallelized representation thereof. The complementary code decoder comprises a correlation circuit that is connected to receive the parallelized input data and generate correlation values therefrom. The correlator circuit is capable of changing its correlation characteristics depending on at least one control signal. The complementary code decoder further comprises a state transition controller that is adapted to sequentially provide different control signals to the correlator circuit thereby driving the correlator circuit to sequentially generate multiple correlation values from the parallelized input data based on different correlation characteristics. The complementary code decoder further comprises a best correlation picker circuit that is connected to receive the multiple correlation values and that is adapted to identify the correlation value that represents the optimum correlation.

In a further embodiment, there may be provided an integrated circuit chip that has CCK decoder circuitry. The CCK decoder circuitry comprises a serial-to-parallel converter circuit that is connected to receive CCK encoded input data and output a parallelized representation thereof. The CCK decoder circuitry further comprises a correlator circuit that is connected to receive the parallelized input data and generate correlation values therefrom. The correlator circuit is capable of changing its correlation characteristics depending on at least one control signal. The CCK decoder circuitry further comprises a state transition control circuit that is adapted to sequentially provide different control signals to the correlator circuit thereby driving the correlator circuit to sequentially generate multiple correlation values from the parallelized input data based on different correlation characteristics. Moreover, the CCK decoder circuitry comprises a best correlation picker circuit that is connected to receive the multiple correlation values and that is adapted to identify the correlation value that represents the optimum correlation.

In still a further embodiment, a method of decoding a CCK encoded input signal comprises receiving the CCK encoded input signal, converting the received data to parallel data, submitting the converted input data to a correlator circuit, sequentially submitting different control signals to the correlator circuit to drive the correlator circuit to sequentially generate multiple correlation values from the parallel data, where the correlator circuit is capable of changing its correlation characteristics depending on the control signals, and identifying the correlation value that represents the optimum correlation.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will now be described with reference to the figure drawings wherein like elements and structures are indicated with like reference numbers.

Figure 4:
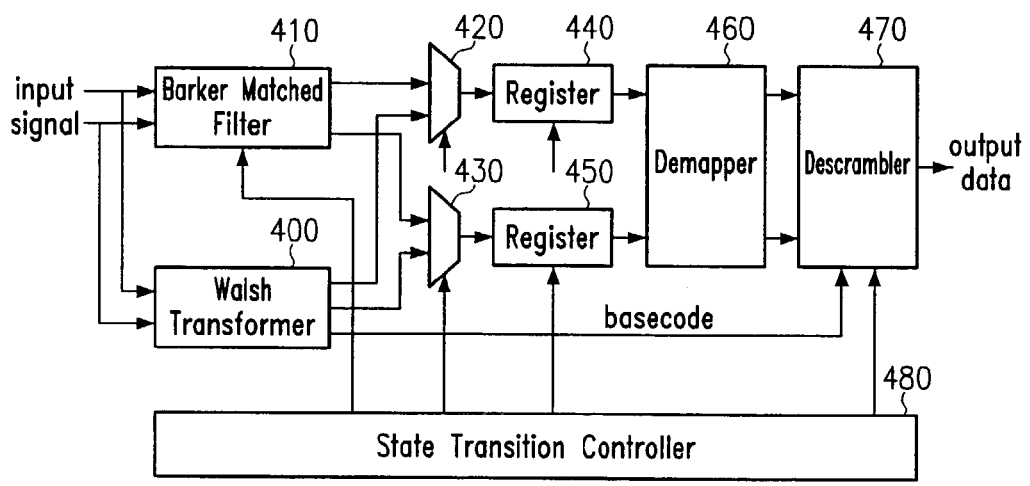
FIG. 4 illustrates 802.11b outer receiver components according to an embodiment.

Referring now to the drawings and particularly to FIG. 4, components of a baseband processor in a WLAN outer receiver according to an embodiment are shown. As apparent from the figure, the complex input signal is fed to a Walsh transformer 400 and a Barker matched filter 410. Further, there is a state transition controller 480 provided that controls the operation of both the Walsh transformer 400 and the Barker matched filter 410. More specifically, the state transition controller 480 provides activity signals to the units to enable at any one time the operation of only one of the Walsh transformer 400 and the Barker matched filter 410. The state transition controller 480 further controls multiplexers 420, 430 that select the complex output signals of the Walsh transformer 400 or the Barker matched filter 410, respectively.

The multiplexed signal is then registered in registers 440, 450 before being processed in the demapper 460. Finally, the signal gets descrambled in unit 470, and for this purpose, the descrambler 470 receives the basecode from the Walsh transformer 400.

In another embodiment, the registers 440, 450 may be combined to form a uniform unit which may be considered, together with some suitable additional circuitry, as a differential demodulator.

Moreover, while the state transition controller 480 is shown in FIG. 4 to provide activity signals to the individual other units of the baseband processor, it may further control the demapper 460 to provide the ability to make adjustments for the various modulation techniques such as BPSK or QPSK, in case it operates on signals from the Barker matched filter 410.

Figure 5:
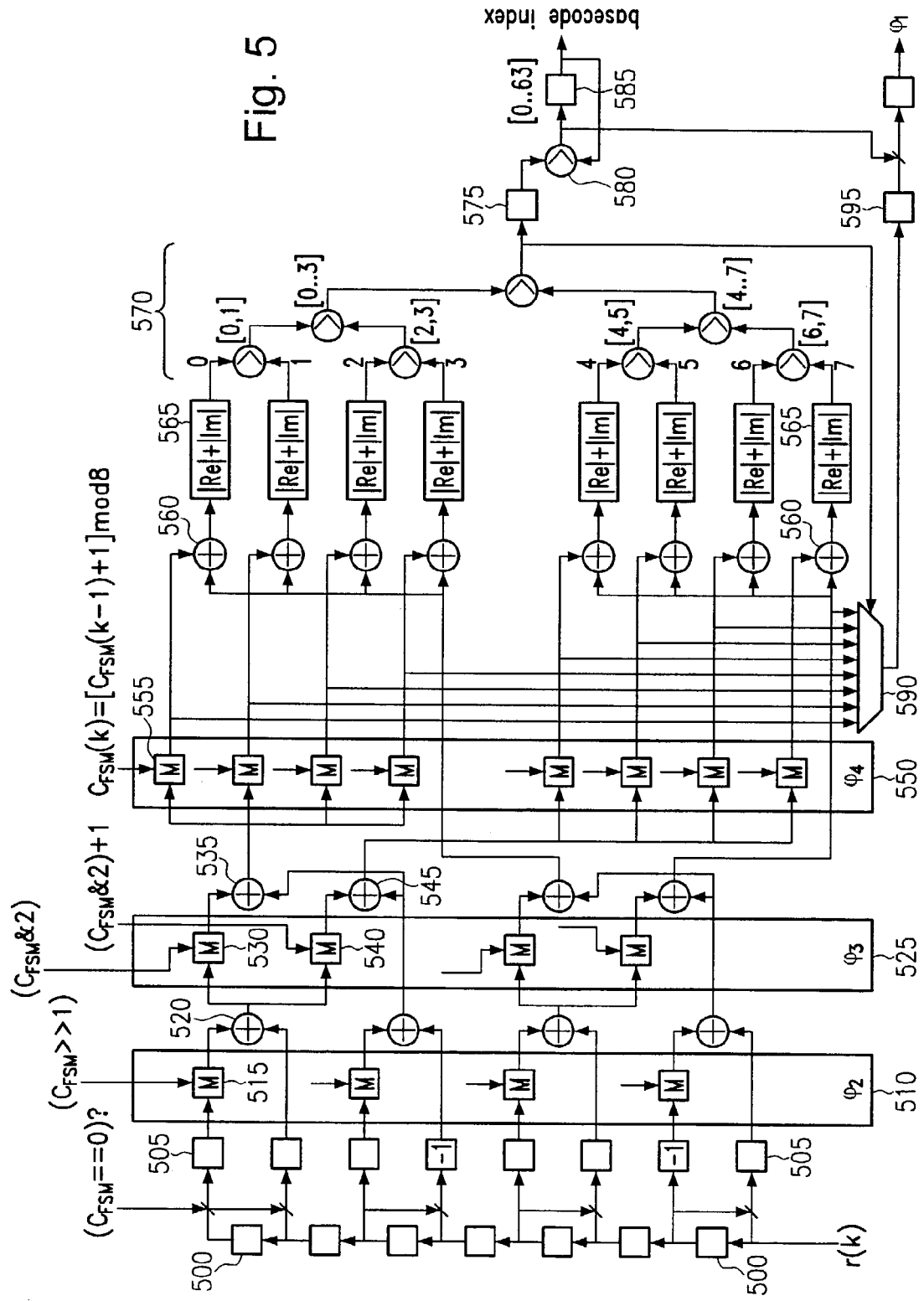
FIG. 5 illustrates a Walsh transformer that may be used in the arrangement of FIG. 4, according to an embodiment.

Turning now to FIG. 5 which illustrates the components of the Walsh transformer 400 of the present embodiment in more detail, the input signal r(k) is fed to the circuit on the lower left side of the figure. The eight chips of the CCK codeword that is received are first parallelized in a serial-to-parallel converter 500. The converter 500 comprises a sequence of seven chip registers that are clocked with the chip rate (e.g. 11 Mcps in the CCK-11 case). Thus, a new codeword will be written into the registers after eight clocks. By controlling an output shutter of the serial-to-parallel converter 500 in an eight clock time distance, a parallelized representation of the CCK encoded input data r(k) is generated and submitted to the following circuitry.

The shutter functionality may be realized by setting output enable signals to the registers 500. This enable signal, or any other control signal used to perform this functionality, is provided by the state transition controller 480. In the present embodiment, the state transition controller 480 is a finite state machine (FSM) that steps from one finite state to the next finite state in a predefined manner. By doing so, the state transition controller realizes a sequential automaton that controls the components of the Walsh transformer 400 and that may further control other components of the baseband processor. In FIG. 5, control signals provided by the state transition controller are denoted $C_{FSM}$.

Once the incoming codeword has been parallelized, some circuitry may be provided for performing initial arithmetic operations on the data elements of the parallelized data. In the embodiment of FIG. 5, an inverter bank 505 is provided for reverting the sign of some of the data elements as required to comply with the above described code definitions.

The parallelized and preprocessed data are then input to a three-stage correlator circuit. Similarly to the three stages 300, 310, 320 of the correlator circuit shown in FIG. 3, each of the stages of the arrangement according to the present embodiment is adapted to perform signal processing operations based on an individual one of the CCK basecode phasors $\phi_2$, $\phi_3$ and $\phi_4$. However, the three-stage structure of the embodiment differs from that of FIG. 3 in that each of the stages shown in FIG. 5 receives control signals from the state transition controller 480 to change its correlation characteristics. In the present embodiment, the three-stage correlation circuit of FIG. 5 is sequentially operated in eight cycles based on the same parallel input data, and the correlation characteristics are changed from cycle to cycle.

Figure 3:
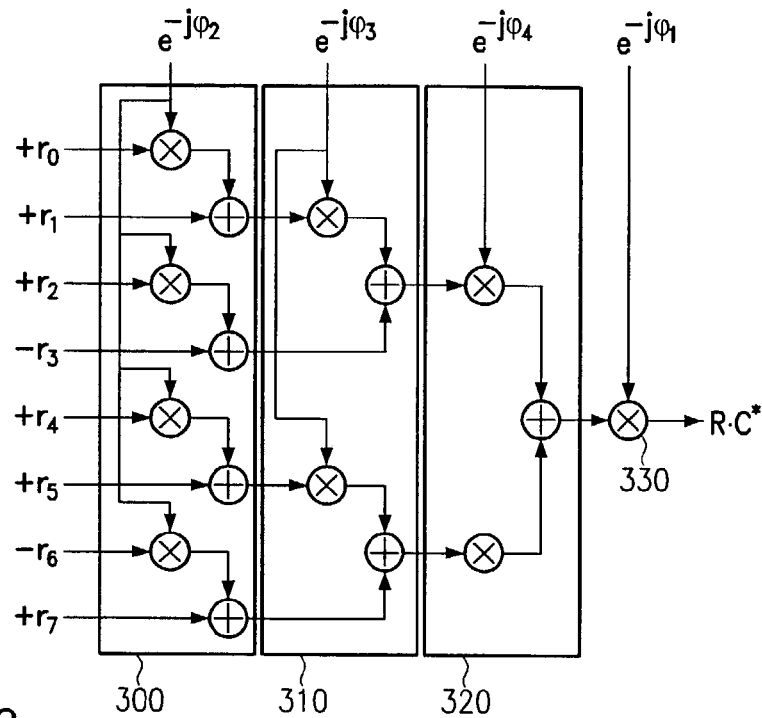
FIG. 3 illustrates a CCK correlator circuit that may be used in the correlator bank that is a component of the demodulator shown in FIG. 2.

That is, while conventional CCK decoders require up to sixty-four separate circuits of the kind shown in FIG. 3, the present embodiment requires to have only one three-stage structure to obtain the same correlation information.

This is achieved by doing both: simultaneously operating on eight parallel data elements (i.e. chips), and using the same hardware structure in an eight cycle sequence where each cycle has different correlation characteristics.

It is to be noted that generally, the number of cycles may be chosen to be sixty-four divided by the number of chips per codeword. It is however to be mentioned that other embodiments exists where the number of cycles may be different from this value.

In the embodiment of FIG. 5, the correlator circuit is made up of a plurality of multiplier units 515, 530, 540, 555 and adders 520, 535, 545 and 560. The multiplier units multiply the respective input signal with the respective phasor factor $e^{-j\phi_2}$, $e^{-j\phi_3}$, $e^{-j\phi_4}$ of the stage. The values of these factors are switched according to the control signal $C_{FSM}$ that is provided by the state transition controller 480.

Figure 6:
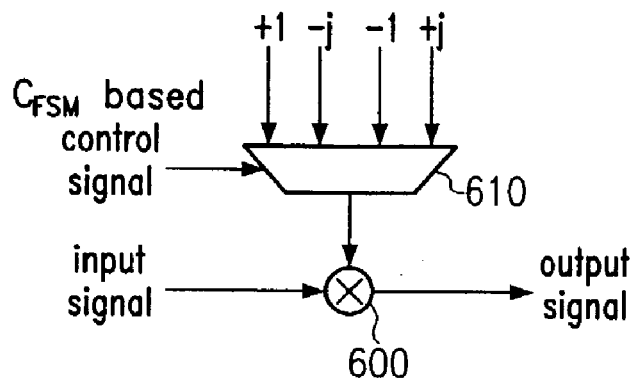
FIG. 6 illustrates a multiplication unit according to an embodiment that may be used in the circuits of FIG. 5.
Figure 7:
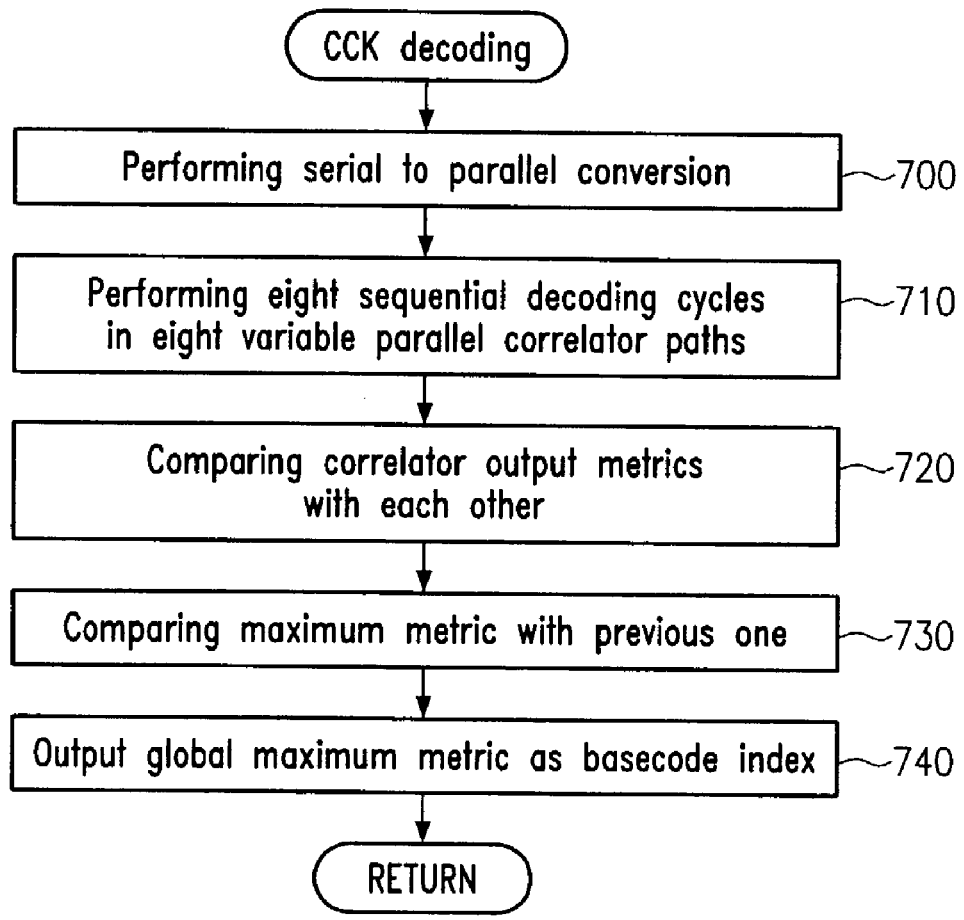
FIG. 7 is a flowchart illustrating the process for complementary code decoding according to an embodiment.

A circuit that may be used as multiplier unit in the correlator circuit of FIG. 5 is illustrated in FIG. 6. As apparent from this figure, the circuit comprises a multiplexer

610 that receives the complex numbers +1, −j, −1, and +j as input values. The multiplexer 610 selects one of the complex numbers based on the $C_{FSM}$ based control signal. The selected complex number is then multiplied with the input signal by multiplier 600. Thus, the state transition controller 480 is allowed for changing the multiplication properties of the circuit by providing respective control signals.

While the circuit shown in FIG. 6 can in principle be used for each of the multiplier units 515, 530, 540, 555 in FIG. 5, it is to be noted that in the present embodiment, the circuit of FIG. 6 is used in stages 510 and 525 only.

Figure 1:
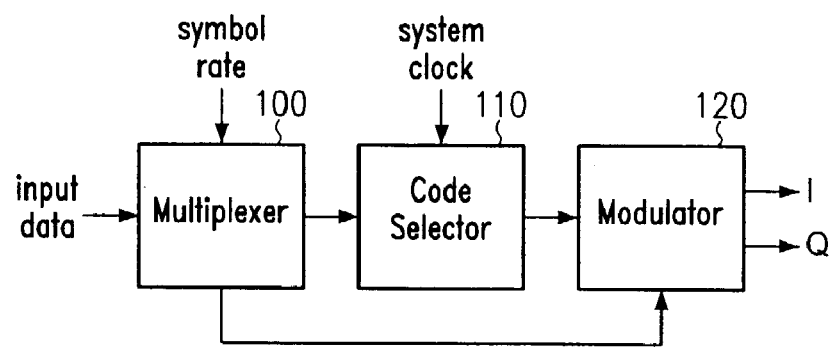
FIG. 1 is a block diagram illustrating the components of a conventional CCK modulator.
Figure 2:
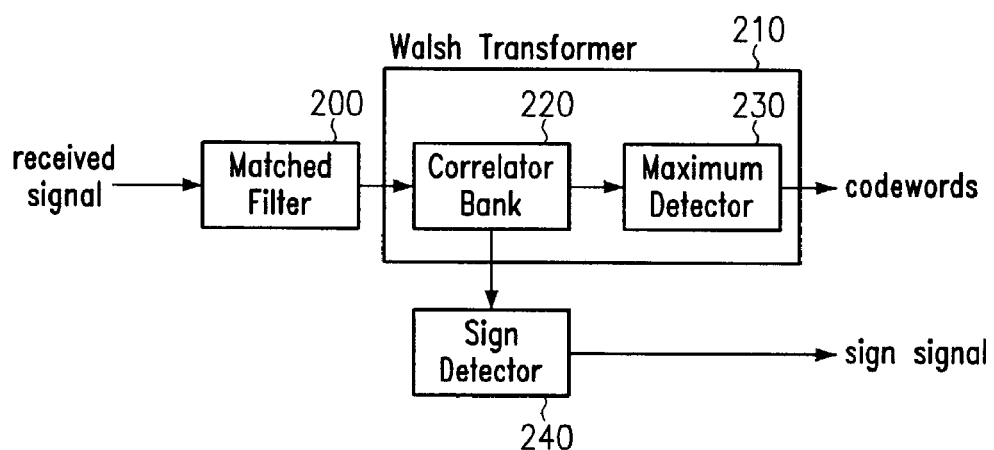
FIG. 2 is a block diagram illustrating a conventional CCK demodulator.

The following table gives an example of how to provide control signals to the Walsh transformer of FIG. 5 to achieve the correlation properties described above. In the table, $C_B$ denotes the basecode part of the codeword, and $\arg C_B$ gives the basecode index that is equivalent to the reversed bit pattern for $\{d_2, \ldots, d_7\}$.

stage 550 and selects one of these signals based on the output of the comparator tree 570. The multiplexed signal is stored in a temporary register 595 which after eight cycles holds the complex value that pertains to that phasor $\phi_1$ that is not a basecode phasor. This complex value may then be passed to a differential demodulator such as the sign detector 240 shown in FIG. 2, and/or to a phase error correction unit of the receiver where the value may provide a phase change estimate.

While the circuits of FIGS. 5 and 6 have been shown to comprise multipliers and adders for performing the correlation functions, it is to be noted that the same architecture can be realized using other structures. For instance, the arithmetic operations that are performed by the multipliers and adders can be realized in other embodiments by programmable elements. For instance, each of the four structures 515, 520 of the first stage 510 of the correlator circuit

| $c_{FSM}$ | $e^{-j\phi_2}$ | $e^{-j\phi_3}$ | $e^{-j\phi_4}$ | $\arg C_B$ | $c_{FSM}$ | $e^{-j\phi_2}$ | $e^{-j\phi_3}$ | $e^{-j\phi_4}$ | $\arg C_B$ |
|---|---|---|---|---|---|---|---|---|---|
| 0 | 1 | 1 | 1 | 0 | 4 | −1 | 1 | 1 | 32 |
|   | 1 | 1 | −j | 1 |   | −1 | 1 | −j | 33 |
|   | 1 | 1 | −1 | 2 |   | −1 | 1 | −1 | 34 |
|   | 1 | 1 | j | 3 |   | −1 | 1 | j | 35 |
|   | 1 | −j | 1 | 4 |   | −1 | −j | 1 | 36 |
|   | 1 | −j | −j | 5 |   | −1 | −j | −j | 37 |
|   | 1 | −j | −1 | 6 |   | −1 | −j | −1 | 38 |
|   | 1 | −j | j | 7 |   | −1 | −j | j | 39 |
| 1 | 1 | −1 | 1 | 8 | 5 | −1 | −1 | 1 | 40 |
|   | 1 | −1 | −j | 9 |   | −1 | −1 | −j | 41 |
|   | 1 | −1 | −1 | 10 |   | −1 | −1 | −1 | 42 |
|   | 1 | −1 | j | 11 |   | −1 | −1 | j | 43 |
|   | 1 | j | 1 | 12 |   | −1 | j | 1 | 44 |
|   | 1 | j | −j | 13 |   | −1 | j | −j | 45 |
|   | 1 | j | −1 | 14 |   | −1 | j | −1 | 46 |
|   | 1 | j | j | 15 |   | −1 | j | j | 47 |
| 2 | −j | 1 | 1 | 16 | 6 | j | 1 | 1 | 48 |
|   | −j | 1 | −j | 17 |   | j | 1 | −j | 49 |
|   | −j | 1 | −1 | 18 |   | j | 1 | −1 | 50 |
|   | −j | 1 | j | 19 |   | j | 1 | j | 51 |
|   | −j | −j | 1 | 20 |   | j | −j | 1 | 52 |
|   | −j | −j | −j | 21 |   | j | −j | −j | 53 |
|   | −j | −j | −1 | 22 |   | j | −j | −1 | 54 |
|   | −j | −j | j | 23 |   | j | −j | j | 55 |
| 3 | −j | −1 | 1 | 24 | 7 | j | −1 | 1 | 56 |
|   | −j | −1 | −j | 25 |   | j | −1 | −j | 57 |
|   | −j | −1 | −1 | 26 |   | j | −1 | −1 | 58 |
|   | −j | −1 | j | 27 |   | j | −1 | j | 59 |
|   | −j | j | 1 | 28 |   | j | j | 1 | 60 |
|   | −j | j | −j | 29 |   | j | j | −j | 61 |
|   | −j | j | −1 | 30 |   | j | j | −1 | 62 |
|   | −j | j | j | 31 |   | j | j | j | 63 |

Turning now back to FIG. 5, the correlator circuit generates in each cycle eight correlator output metrics, i.e., correlation values that are compared to each other by the comparator tree 570 that comprises seven comparators. The biggest correlation value is registered in register 575 and compared with the maximum metric of the previous cycles.

For this purpose, a register 585 is provided that outputs its contents to the comparator 580 where the registered value is compared with the correlation value of the current cycle that was stored in register 575. The greater value, i.e. that showing the better correlation, is then written into the register 585.

That is, at the end of the eight-cycle process, the register 585 stores the global maximum metric for the received CCK symbol, i.e. the basecode index.

As apparent from the figure, there may further be provided a multiplexer 590 that receives signals from the third that comprise one multiplier 515 and one adder 520 may be implemented in software coded form by realizing the following pseudo code. In this code, the variable mode corresponds to the value of the control signal issued by the state transition controller 480.

```
case(mode)
2'D0: begin
    phi2_real = {in_real_1[5],in_real_1} +
      {in_real_2[5],in_real_2};
    phi2_imag = {in_imag_1[5],in_imag_1} +
      {in_imag_2[5],in_imag_2};
  end
2'D1: begin
    phi2_real = {in_imag_1[5],in_imag_1} +
      {in_real_2[5],in_real_2};
```

```
            phi2_imag = {in_imag_2[5],in_imag_2} -
                {in_real_1[5],in_real_1};
            end
        2'D2: begin
            phi2_real = {in_real_2[5],in_real_2} -
                {in_real_1[5],in_real_1};
            phi2_imag = {in_imag_2[5],in_imag_2} -
                {in_imag_1[5],in_imag_1};
            end
        2'D3: begin
            phi2_real = {in_real_2[5],in_real_2} -
                {in_imag_1[5],in_imag_1};
            phi2_imag = {in_imag_2[5],in_imag_2} +
                {in_real_1[5],in_real_1};
            end
        endcase
```

Similarly, the multiplier-adder structures 530, 535; 540, 545 of the second stage 525 may be realized by:

```
        case(c_mode)
        2'D0: begin
            phi3_real = {in_real_1[5],in_real_1} +
                {in_real_2[5],in_real_2};
            phi3_imag = {in_imag_1[5],in_imag_1} +
                {in_imag_2[5],in_imag_2};
            end
        2'D1: begin
            phi3_real = {in_imag_1[5],in_imag_1} +
                {in_real_2[5],in_real_2};
            phi3_imag = {in_imag_2[5],in_imag_2} -
                {in_real_1[5],in_real_1};
            end
        2'D2: begin
            phi3_real = {in_real_2[5],in_real_2} -
                {in_real_1[5],in_real_1};
            phi3_imag = {in_imag_2[5],in_imag_2} -
                {in_imag_1[5],in_imag_1};
            end
        2'D3: begin
            phi3_real = {in_real_2[5],in_real_2} -
                {in_imag_1[5],in_imag_1};
            phi3_imag = {in_imag_2[5],in_imag_2} +
                {in_real_1[5],in_real_1};
            end
        endcase
```

In the third stage, the operation of the arithmetic structures may similarly be described by:

```
phi40_real = {phi3_0_real[7],phi3_0_real} + {phi3_1_real[7],phi3_1_real};
phi40_imag = {phi3_0_imag[7],phi3_0_imag} + {phi3_1_imag[7],phi3_1_imag};
phi41_real = {phi3_1_real[7],phi3_1_real} + {phi3_0_imag[7],phi3_0_imag};
phi41_imag = {phi3_1_imag[7],phi3_1_imag} - {phi3_0_real[7],phi3_0_real};
phi42_real = {phi3_1_real[7],phi3_1_real} - {phi3_0_real[7],phi3_0_real};
phi42_imag = {phi3_1_imag[7],phi3_1_imag} - {phi3_0_imag[7],phi3_0_imag};
phi43_real = {phi3_1_real[7],phi3_1_real} - {phi3_0_imag[7],phi3_0_imag};
phi43_imag = {phi3_1_imag[7],phi3_1_imag} + {phi3_0_real[7],phi3_0_real};
```

Given the above described embodiments, a fully pipelined CCK decoder is described that can solve the ML CCK decoding problem to obtain the basecode index within eight steps using a minimum set of operator blocks. In fact, by avoiding a large set of conventional correlator circuits to be realized, the required chip area can be reduced to one fourth. This advantageously reduces the manufacturing costs and further improves the efficiency of the overall operation.

The embodiments make use of eight parallel variable correlator paths that are used eight times per symbol. Thus, the circuit structure is advantageously reused multiple times so that the gate count of the CCK decoder block can be strongly decreased.

While the embodiments described above primarliy relate to the CCK-11 mode defined in the 802.11b specification, it is to be mentioned that other embodiments exist where the 5.5 Mbps mode is used. In this mode, the information of two bits is spread over three basecode phasors. This causes only the basecode indices {16, 48, 18, 50} to be valid. Thus, the same structure as that shown in FIG. 5 can be used and only some changes to the signal assignment performed by the state transition controller 480 need to be done to pass only those values to the comparator tree that match the mentioned basecode indices.

Moreover, while the above described embodiments relate to CCK decoders in WLAN receivers, it is to be noted that other embodiments exist where the decoder structure discussed above is used to decode other complementary codes in other data communication systems.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A WLAN (Wireless Local Area Network) receiver having a CCK (Complementary Code Keying) decoder comprising:

a serial-to-parallel converter connected to receive CCK encoded input data and output a parallelized representation thereof;

a correlator circuit connected to receive the parallelized input data and generate correlation values therefrom, said correlator circuit being capable of changing its correlation characteristics depending on at least one control signal;

a state transition controller adapted to sequentially provide different control signals to said correlator circuit thereby driving said correlator circuit to sequentially generate multiple correlation values from said parallelized input data based on different correlation characteristics; and a best correlation picker circuit connected to receive said multiple correlation values and adapted to identify the correlation value representing the optimum correlation.

2. The WLAN receiver of claim 1, wherein said state transition controller is adapted to drive said correlator circuit to sequentially generate said multiple correlation values in a multicycle sequence based on correlation characteristics that change from cycle to cycle.

3. The WLAN receiver of claim 2, wherein the number of cycles in said multicycle sequence is eight.

4. The WLAN receiver of claim 2, wherein said parallelized input data comprises a plurality of data elements and said correlator circuit comprises a plurality of input terminals to receive said data elements, wherein the number of data elements is equal to the number of input terminals.

5. The WLAN receiver of claim 4, wherein said data elements have complex values.

6. The WLAN receiver of claim 4, wherein said number of data elements and input terminals is eight.

7. The WLAN receiver of claim 4, wherein the number of cycles in said multicycle sequence is chosen to be 64 divided by said number of data elements and input terminals.

8. The WLAN receiver of claim 2, wherein said best correlation picker circuit is connected to receive multiple correlation values in each cycle of said multicycle sequence.

9. The WLAN receiver of claim 8, wherein said best correlation picker circuit is adapted to identify in each cycle the best correlation value for that cycle.

10. The WLAN receiver of claim 9, wherein said best correlation picker circuit comprises circuitry connected to receive said best correlation values for each cycle, and adapted to identify said optimum correlation value therefrom.

11. The WLAN receiver of claim 10, wherein said circuitry comprises a register storing the best correlation value pertaining to respective previous cycles, and a comparator for comparing said previous best correlation value with the current best correlation value.

12. The WLAN receiver of claim 11, wherein said comparator is connected to said register to write the better one of said previous best correlation value and said current best correlation value into said register.

13. The WLAN receiver of claim 1, wherein said correlator circuit comprises a plurality of multipliers and adders for performing signal processing operations based on the CCK basecode phasors.

14. The WLAN receiver of claim 1, wherein said correlator circuit is a three-stage circuit where each of the stages is adapted to perform signal processing operations based on an individual one of the CCK basecode phasors.

15. The WLAN receiver of claim 14, wherein each of the stages comprises circuitry for performing at least two signal processing operations in parallel.

16. The WLAN receiver of claim 14, wherein each of the stages comprises a plurality of multipliers and adders for performing said signal processing operations.

17. The WLAN receiver of claim 16, wherein at least two of said stages comprises a plurality of multiplexers with each of the multiplexers being connected to one of said multipliers, said multiplexers being controlled by said at least one control signal provided by said state transition controller.

18. The WLAN receiver of claim 17, wherein the multiplexers of one of said stages are connected to each receive the same control signal.

19. The WLAN receiver of claim 17, wherein the multiplexers of one of said stages are connected to each receive different control signals.

20. The WLAN receiver of claim 17, wherein the control signals used for controlling the multiplexers in a first one of said at least two stages are different from the control signals used for controlling the multiplexers in a second one of said at least two stages.

21. The WLAN receiver of claim 17, wherein said multiplexers are controlled by said control signals to multiplex between the complex numbers 1, −j, −1, and j.

22. The WLAN receiver of claim 1, wherein the correlation value representing the optimum correlation is the maximum correlation value.

23. The WLAN receiver of claim 1, further comprising a multiplexer receiving said correlation values from said correlator circuit for selecting one of said multiple correlation values to determine the one CCK phasor that is not a basecode phasor.

24. A complementary code decoder comprising:
a serial-to-parallel converter connected to receive serially encoded input data and output a parallelized representation thereof;
a correlator circuit connected to receive the parallelized input data and generate correlation values therefrom, said correlator circuit being capable of changing its correlation characteristics depending on at least one control signal;
a state transition controller adapted to sequentially provide different control signals to said correlator circuit thereby driving said correlator circuit to sequentially generate multiple correlation values from said parallelized input data based on different correlation characteristics; and
a best correlation picker circuit connected to receive said multiple correlation values and adapted to identify the correlation value representing the optimum correlation.

25. An integrated circuit chip having CCK (Complementary Code Keying) decoder circuitry comprising:
a serial-to-parallel converter circuit connected to receive CCK encoded input data and output a parallelized representation thereof;
a correlator circuit connected to receive the parallelized input data and generate correlation values therefrom, said correlator circuit being capable of changing its correlation characteristics depending on at least one control signal;
a state transition control circuit adapted to sequentially provide different control signals to said correlator circuit thereby driving said correlator circuit to sequentially generate multiple correlation values from said parallelized input data based on different correlation characteristics; and
a best correlation picker circuit connected to receive said multiple correlation values and adapted to identify the correlation value representing the optimum correlation.

26. A method of decoding a CCK (Complementary Code Keying) encoded input signal, the method comprising:
receiving said CCK encoded input data;
converting the received data to parallel data;
submitting the converted input data to a correlator circuit;
sequentially submitting different control signals to said correlator circuit to drive said correlator circuit to sequentially generate multiple correlation values from said parallel data, said correlator circuit being capable of changing its correlation characteristics depending on said control signals; and identifying the correlation value representing the optimum correlation.

27. The method of claim 26, wherein sequentially generating said multiple correlation values is performed in a multicycle sequence where said correlation characteristics are changed from cycle to cycle.

28. The method of claim 27, wherein the number of cycles in said, multicycle sequence is eight.

29. The method of claim 27, wherein said parallel data comprises a plurality of data elements and said correlator circuit comprises a plurality of input terminals to receive said data elements, wherein the number of data elements is equal to the number of input terminals.

30. The method of claim 29, wherein said data elements have complex values.

31. The method of claim 29, wherein said number of data elements and input terminals is eight.

32. The method of claim 29, wherein the number of cycles in said multicycle sequence is chosen to be 64 divided by said number of data elements and input terminals.

33. The method of claim 27, wherein identifying the correlation value comprises:
receiving multiple correlation values in each cycle of said multicycle sequence.

34. The method of claim 33, wherein identifying the correlation value comprises:
identifying in each cycle the best correlation value for that cycle.

35. The method of claim 34, wherein identifying the correlation value comprises:
receiving said best correlation values for each cycle; and
identifying said optimum correlation value from the received values.

36. The method of claim 35, wherein identifying said optimum correlation value comprises:
storing the best correlation value pertaining to previous cycles in a register; and
comparing said previous best correlation value with the current best correlation value.

37. The method of claim 36, further comprising:
writing the better one of said previous best correlation value and said current best correlation value into said register.

38. The method of claim 26, wherein sequentially generating said multiple correlation values comprises:
operating a plurality of multipliers and adders for performing signal processing operations based on the CCK basecode phasors.

39. The method of claim 26, wherein said correlator circuit is a three-stage circuit, wherein sequentially generating said multiple correlation values comprises:
operating each of the stages to perform signal processing operations based on an individual one of the CCK basecode phasors.

40. The method of claim 39, wherein operating each of the stages comprises:
performing at least two signal processing operations in parallel.

41. The method of claim 39, wherein operating each of the stages comprises:
operating a plurality of multipliers and adders for performing said signal processing operations.

42. The method of claim 41, wherein at least two of said stages comprises a plurality of multiplexers with each of the multiplexers being connected to one of said multipliers, wherein operating said at least two stages comprises:
controlling said multiplexers by said control signals.

43. The method of claim 42, wherein controlling said multiplexers in one of said stages comprises:
receiving the same control signal at each of the multiplexers.

44. The method of claim 42, wherein controlling said multiplexers in one of said stages comprises:
receiving different control signals at different multiplexers.

45. The method of claim 42, wherein the control signals used for controlling the multiplexers in a first one of said at least two stages are different from the control signals used for controlling the multiplexers in a second one of said at least two stages.

46. The method of claim 42, wherein said multiplexers are controlled by said control signals to multiplex between the complex numbers 1, −j, −1, and j.

47. The method of claim 26, wherein the correlation value representing the optimum correlation is the maximum correlation value.

48. The method of claim 26, further comprising:
receiving said multiple correlation values; and
selecting one of said multiple correlation values to determine the one CCK phasor that is not a basecode phasor.

* * * * *